United States Patent [19]
Baillely et al.

[11] Patent Number: 5,891,837
[45] Date of Patent: *Apr. 6, 1999

[54] STABILIZED BLEACHING COMPOSITIONS

[75] Inventors: Gerard Marcel Baillely, Gosforth; Graham Alexander Sorrie, Morpeth, both of Great Britain

[73] Assignee: The Procter & Gamble Company, Cincinnati, Ohio

[*] Notice: This patent issued on a continued prosecution application filed under 37 CFR 1.53(d), and is subject to the twenty year patent term provisions of 35 U.S.C. 154(a)(2).

[21] Appl. No.: 581,575
[22] PCT Filed: Jul. 13, 1994
[86] PCT No.: PCT/US94/07823
  § 371 Date: Jan. 16, 1996
  § 102(e) Date: Jan. 16, 1996
[87] PCT Pub. No.: WO95/02676
  PCT Pub. Date: Jan. 26, 1995

[30] Foreign Application Priority Data

Jul. 14, 1993 [EP] European Pat. Off. ............... 93870143

[51] Int. Cl.⁶ .............................. C11D 3/39; C11D 7/18; C01B 15/10
[52] U.S. Cl. ...................... 510/309; 510/310; 510/312; 252/186.27; 252/186.38; 252/186.22
[58] Field of Search .................... 252/186.2, 186.22, 252/186.23, 186.27, 186.38; 510/309, 310, 312; 423/415.2

[56] References Cited

U.S. PATENT DOCUMENTS

| | | | |
|---|---|---|---|
| 3,860,694 | 1/1975 | Jayawant | 423/307 |
| 4,016,090 | 4/1977 | Nakagawa et al. | 252/186.38 |
| 4,170,453 | 10/1979 | Kitko et al. | 8/111 |
| 4,171,280 | 10/1979 | Maddox et al. | 252/186.32 |
| 4,215,990 | 8/1980 | Barrett, Jr. et al. | 8/107 |
| 4,260,508 | 4/1981 | Maddox | 252/186.32 |
| 4,325,828 | 4/1982 | Postlehwaite | 510/310 |
| 4,970,058 | 11/1990 | Hills et al. | 423/415.2 |
| 4,988,363 | 1/1991 | Barnes | 8/111 |
| 5,258,133 | 11/1993 | Chapple | 510/375 |
| 5,332,518 | 7/1994 | Kuroda et al. | 510/309 |

*Primary Examiner*—Joseph D. Anthony
*Attorney, Agent, or Firm*—Ian S. Robinson; Brian M. Bolam; Kim William Zerby

[57] ABSTRACT

There is a bleaching composition comprising alkali metal percarbonate as an oxygen releasing compound, and alkali metal carbonate particles or bicarbonate particles of defined size (mean particle size of 300 μm or greater) wherein fewer than 10% of the particles have a particle size below 250 μm. The said composition comprises discrete particles of said alkali metal percarbonate salt and said alkali metal carbonate or said alkali metal bicarbonate. The particle bleaching composition may form a component of a machine dishing composition, a bleach booster composition or in particular a laundry detergent composition. The percarbonate has increased storage stability in the composition of the invention.

19 Claims, No Drawings

STABILIZED BLEACHING COMPOSITIONS

This Application claims priority under 35 U.S.C. §371 to a International Application Serial Number PCT/US94/07823 filed Jul. 1, 1994.

This invention relates to bleaching compositions comprising alkali metal percarbonate as an oxygen-releasing compound and alkali metal carbonate or bicarbonate particles. These bleaching compositions are useful as components of laundry detergent compositions, machine dishwashing compositions and bleach booster compositions, in particular laundry detergent compositions.

Bleaching compositions containing alkali metal percarbonate are known in the art. Percarbonate is an attractive perhydrate bleaching agent for use in bleaching compositions because it dissolves readily in water and is weight efficient. In laundry detergent compositions it is particularly useful because after giving up its available oxygen it provides a useful source of carbonate ions for detergency purposes and does not provide undesirable by-products.

The inclusion of percarbonate salts in bleaching compositions has been restricted hitherto by the relative instability of the bleach. In particular, percarbonate salts decompose rapidly when stored in a moist and/or warm atmosphere.

Bleaching compositions containing percarbonate as a bleaching component usually also contain carbonate such as sodium carbonate. This acts to neutralise acidity released when the composition is added to water. Such acidity inhibits the performance of the percarbonate and may inhibit the performance of other components of the bleaching composition, for instance enzymes in the case of laundry detergent compositions. In the case of granular zeolite-built detergent compositions the carbonate acts also to facilitate processing of the zeolite-containing composition into granules.

However, the presence of carbonate particles can contribute to reduced storage stability of the percarbonate. During storage, in particular storage under cool conditions, carbonate particles can absorb moisture, which is released during storage in warm conditions, for instance at above 30° C. In the resulting warm, moist atmosphere the storage stability of the percarbonate is reduced.

It has been attempted to solve this problem by coating the carbonate particles. However this is a complex and expensive process and may reduce the ability of the carbonate to absorb moisture; this moisture-absorption ability is an advantageous one, therefore to reduce it is not preferred.

According to the invention there is provided a particulate composition comprising:

(a) an alkali metal percarbonate salt and
(b) particles of alkali metal carbonate or bicarbonate, said particles having a mean particle size of 250 $\mu$m or greater.

It has been found that the use of particles of carbonate with the defined size results in greater storage stability of the particulate compositions of the invention whilst retaining the fast release of alkalinity in cold water necessary for good product performance.

The alkali metal carbonate or bicarbonate is preferably selected from sodium carbonate, potassium carbonate, sodium bicarbonate and potassium bicarbonate and mixtures thereof. Particularly preferred mixtures include mixtures of sodium carbonate with sodium bicarbonate, sodium carbonate with potassium carbonate and sodium carbonate with sodium bicarbonate and potassium carbonate.

The particles of carbonate and bicarbonate have a mean particle size of 250 $\mu$m or greater, preferably 300 $\mu$m or greater, more preferably 400 to 800 $\mu$m. It is preferred that fewer than 20% of the particles have a particle size below 250 $\mu$m and that fewer than 5% have a particle size below 150 $\mu$m; more preferably fewer than 10% have a particle size below 250 $\mu$m. It is also preferred that fewer than 20% of the carbonate or bicarbonate particles have a particle size greater than 1,000 $\mu$m.

The mean particle size of the particles of carbonate and bicarbonate herein is determined by reference to a method involving choice of varied sizes of sieve through which the sample is attempted to be passed. The mean particle size of a sample is given by the diameter of sieve through which half of the mass of the sample will pass, and accordingly through which half of the sample will not pass. It will be appreciated by a person skilled in the art that a suitably large size of sample should be employed in any determination to give a statistically meaningful result. It will also be appreciated that for any large bulk sample, a number of representative smaller samples made at sampling points throughout the extent of the bulk sample should be made, as are sufficient to give a statistically meaningful result. Another (equivalent) way of expressing the mean particle size herein is that it is the particle size at which a line drawn vertically such as to bisect the area under the differential particle size distribution curve would result in an equal dissection of that area into two equal parts.

The alkali metal percarbonate used may preferably be sodium percarbonate or potassium percarbonate, more preferably sodium percarbonate. The percarbonate is generally in particulate form. The percarbonate particles generally have a mean particle diameter of 150–1200 $\mu$m, preferably 300–900 $\mu$m. The particles of percarbonate may be coated or uncoated. If the percarbonate particles are coated this is preferably with a water-soluble coating. Suitable coating materials include the alkali and alkaline earth metal carbonates; the alkali or alkaline earth metal sulphates; the mixed salts of alkali or alkaline earth metal sulphates and carbonates; the mixed salts of alkali or alkaline earth metal chlorides and carbonates; the mixed salts of alkali or alkaline earth metal nitrates and carbonates.

It is preferable that both the carbonate or bicarbonate and the percarbonate particles are introduced into the composition by dry mixing, since this facilitates achieving rapid dissolution of both when the composition is added to water.

The particulate composition of the invention may take various forms. It may be a machine dishwashing composition of otherwise conventional composition and so may also comprise alkaline material selected from sodium silicate and sodium hydroxide. The carbonate or bicarbonate is preferably present in an amount of 5 to 50% by weight of total composition. It may be a bleach booster composition of otherwise conventional composition for addition to a laundry wash.

Preferably it is a laundry detergent composition. This is preferably phosphate-free and is preferably zeolite built. It may also comprise surfactant typically in an amount of 3 to 35% by weight of total composition, said surfactant being selected from anionic, cationic, nonionic, ampholytic and zwitterionic surfactants and mixtures thereof.

When the composition of the invention is a laundry detergent composition it may preferably contain carbonate or bicarbonate in an amount of 5 to 25%, more preferably 5 to 20%, by weight of total composition; percarbonate is preferably present in an amount of up to 40% by weight of total composition.

Where the bleaching processes utilizing the bleaching compositions of the invention are carried out at least in part at temperatures lower than about 60° C. the bleaching compositions of the invention will also preferably contain additional bleaching agents more suited to low temperature bleaching. These will include, for example peroxyacid bleach precursors (bleach activators) and preformed organic peracids.

The peroxyacid bleach precursors probably contain one or more N— or O— acyl groups, which precursors can be selected from a wide range of classes. Suitable classes include anhydrides, esters, imides and acylated derivatives of imidazoles and oximes, and examples of useful materials within these classes are disclosed in GB-A-1586789. The most preferred classes are esters such as are disclosed in GB-A-836988, 864,798, 1147871 and 2143231 and imides such as are disclosed in GB-A-855735 & 1246338.

Particularly preferred precursor compounds are the N,N, $N^1,N^1$ tetra acetylated compounds of formula

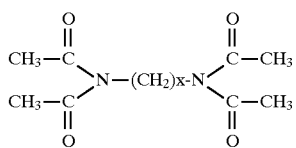

wherein x can be O or an integer between 1 & 6.

Examples include tetra acetyl methylene diamine (TAMD) in which x=1, tetra acetyl ethylene diamine (TAED) in which x=2 and tetraacetyl hexylene diamine (TAHD) in which x=6. These and analogous compounds are described in GB-A-907356. The most preferred peroxyacid bleach precursor is TAED.

Another preferred class of peroxyacid bleach activator compounds are the amide substituted compounds of the following general formulae:

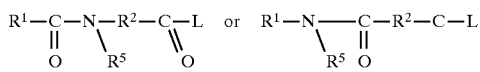

wherein $R^1$ is an aryl or alkaryl group with from about 1 to about 14 carbon atoms, $R^2$ is an alkylene, arylene, and alkarylene group containing from about 1 to 14 carbon atoms, and $R^5$ is H or an alkyl, aryl, or alkaryl group containing 1 to 10 carbon atoms and L can be essentially any leaving group. $R^1$ preferably contains from about 6 to 12 carbon atoms. $R^2$ preferably contains from about 4 to 8 carbon atoms. $R^1$ may be straight chain or branched alkyl, substituted aryl or alkylaryl containing branching, substitution, or both and may be sourced from either synthetic sources or natural sources including for example, tallow fat. Analogous structural variations are permissible for $R^2$. The substitution can include alkyl, aryl, halogen, nitrogen, sulphur and other typical substituent groups or organic compounds. $R^5$ is preferably H or methyl. $R^1$ and $R^5$ should not contain more than 18 carbon atoms total. Amide substituted bleach activator compounds of this type are described in EP-A-0170386.

Other peroxyacid bleach precursor compounds include sodium nonanoyloxy benzene sulfonate, sodium trimethyl hexanoyloxy benzene sulfonate, sodium acetoxy benzene sulfonate and sodium benzoyloxy benzene sulfonate as disclosed in, for example, EP-A-0341947.

The compositions of the invention may contain as the peroxy compound organic peroxyacids of which a particularly preferred class are the amide substituted peroxyacids of general formulae:

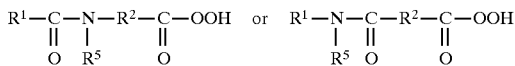

where $R^1$, $R^2$ and $R^5$ are as defined previously for the corresponding amide substituted peroxyacid bleach activator compounds.

Other organic peroxyacids include the diacyl peroxides and dialkyl peroxides. Suitable are diperoxy dodecanedioic acid, diperoxy tetra decanedioic acid, diperoxyhexadecanedioc acid, mono- and diperazelaic acid, mono- and diperbrassylic acid, monoperoxy phthalic acid, perbenzoic acid, and their salts as disclosed in, for example, EP-A-0341 947.

The bleaching compositions of the invention are useful in the bleaching of cellulosic fibrous material. The term cellulosic fibrous material as used herein has reference to wood, cotton, linen, jute and other materials of a cellulosic nature, and also includes individual fibres, for example wood pulp or cotton fibre, as well as yarns, tows, webs, fabrics (woven or non-woven) and other aggregates of such fibres. The bleaching compositions of the invention are also useful in the belaching of synthetic textiles including polyamides, viscose, rayon, and polyesters.

The bleaching compositions of the invention are also useful in cleaning compositions. These cleaning compositions may be used in essentially any washing, laundering or cleaning processes in which bleaching is required. Thus, the cleaning compositions may be used in home or industrial laundering or automatic dishwashing processes, as laundry additive compositions, stain pretreat compositions, carpet and upholstery cleaners, and in any process involving the cleaning of hard surfaces such as bottle washing, dairy cleaning and kitchen and bathroom cleaning processes, including for example toilet bowl cleaning.

In processes for the bleaching of cellulosic fibre or synthetic textiles the bleaching compositions of the invention are used in an aqueous solution. The most preferred peroxy compound for use in such processes is hydrogen peroxide. The pH of the aqueous peroxy solution is often adjusted with inorganic alkali metal basic materials, such as sodium hydroxide, sodium carbonate, sodium silicate and mixtures thereof. The optimum pH lies somewhere between 7.5 to 12.5. Usually, if the pH is higher than about 12.5 the peroxy-compounds rapidly decompose so that it is difficult to control a proper bleaching rate without undue damage to the fibres. At pH values lower than about 7.5 the rate of bleaching in most cases is slow to the extent of being uneconomical for bleaching.

Whilst amorphous silicates, especially sodium silicate may be used to provide alkalinity in the peroxy solutions for use in the bleaching of cellulosic fibres its tendency to form as deposits on the fibres being bleached means that its use is preferably kept to a minimum. Crystalline layered silicates when co-agglomerated with acid materials such as citric acid are preferred since they do not deposit on fabrics. Most preferably, the peroxy solutions for use in the bleaching of cellulosic fibres and synthetic textiles using the bleaching compositions of the invention contain no or little (less than 5%) sodium silicate.

The methods for bleaching using the peroxy solutions containing the bleaching compositions of the present invention vary widely, as for example, from using the peroxy solutions at temperatures of from about 70° C. to about 100° C. for periods of time from about 30 minutes to about 6–8 hours, as well as continuous bleaching methods which entail the use of the peroxy solutions at normal temperatures, ie., about 25° C. and contacting the cellulose material by saturation, removing the excess moisture and exposing the cellulose material to saturated steam at temperatures form about 100° C. to about 135° C., for period of time from a few seconds (about 20) to about 1 hour and even longer in some cases. U.S. Pat. Nos. 2,839,353, 2,960,383, and 2,983,568 are illustrative of being representative of continuous peroxy bleaching methods.

The bleaching compositions of the invention may also be incorporated into compositions for use in essentially any laundering, washing or cleaning processes. Laundry compositions incorporating the bleaching compositions of the invention can be formulated as granular compositions and heavy duty liquid compositions.

The compositions may in addition comprise in general terms those ingredients commonly found in detergent products which may include organic surfactants, detergent builders, anti-redeposition and soil supsension agents, suds suppressors, enzymes, optical brighteners, photoactivated bleaches, perfumes, filler salts, anticorrosion agents and colours.

Laundry detergent compositions may also comprise fabric softening and antistatic agents.

A wide range of surfactants can be used in the detergent compositions. A typical listing of anionic, nonionic, ampholytic and zwitterionic classes, and species of these surfactants, is given in U.S. Pat. No. 3,929,678 issued to Laughlin and Heuring on Dec. 30, 1975. A list of suitable cationic surfactants is given in U.S. Pat. No. 4,259,217 issued to Murphy on Mar. 31, 1981.

Mixtures of anionic surfactants are suitable herein, particularly blends of sulphate, sulphonate and/or carboxylate surfactants. Mixtures of sulphonate and sulphate surfactants are normally employed in a sulphonate to sulphate weight ratio of from 5:1 to 1:2, preferably from 3:1 to 2:3, more preferably from 3:1 to 1:1. Preferred sulphonates include alkyl benzene sulphonates having from 9 to 15, especially 11 to 13 carbon atoms in the alkyl radical, and alpha-sulphonated methyl fatty acid esters in which the fatty acid is derived from a $C_{12}$–$C_{18}$ fatty source, preferably from a $C_{16}$–$C_{18}$ fatty source. In each instance the cation is an alkali metal, preferably sodium. Preferred sulphate surfactants in such sulphonate sulphate mixtures are alkyl sulphates having from 12 to 22, preferably 16 to 18 carbon atoms in the alkyl radical.

Another useful surfactant system comprises a mixture of two alkyl sulphate materials whose respective mean chain lengths differ from each other. One such system comprises a mixture of $C_{14}$–$C_{15}$ alkyl sulphate and $C_{16}$–$C_{18}$ alkyl sulphate in a weight ratio of $C_{14}$–$C_{15}$: $C_{16}$–$C_{18}$ of from 3:1 to 1:1. The alkyl sulphates may also be combined with alkyl ethoxy sulphates having from 10 to 20, preferably 10 to 16 carbon atoms in the alkyl radical and an average degree of ethoxylation of 1 to 6. The cation in each instance is again an alkali metal, preferably sodium.

Another highly preferred anionic surfactant system comprises a mixture of a $C_{12}$–$C_{20}$ alkyl sulfate salt with a water soluble $C_{11}$–$C_{18}$ alkyl ethoxysulfate salt containing an average of from 1 to 7 ethoxy groups per mole wherein the weight ratio of alkyl sulfate to alkyl ethoxysulfate salt lies in the range from 2:1 to 19:1, more preferably from 3:1 to 12:1 and most preferably from 3.5:1 to 10:1.

The alkyl sulfate salts may be derived from natural or synthetic hydrocarbon sources. Preferred examples of such salts include the substantially branched $C_{14}$–$C_{15}$ alkyl sulfate salts, that is where the degree of branching of the $C_{14}$–$C_{15}$ alkyl chain is greater than about 20%. Such substantially branched $C_{14}$–$C_{15}$ alkyl sulfate salts are usually derived from synthetic sources. Also preferred are $C_{16}$–$C_{20}$ alkyl sulfate salts which are usually derived from natural sources such as tallow fat and marine oils.

The $C_{11}$–$C_{18}$ alkyl ethoxysulfate salt comprises a primary alkyl ethoxysulfate which is derived from the condensation product of a $C_{11}$–$C_{18}$ alcohol condensed with an average of from one to seven ethylene oxide groups, per mole. Preferred are the $C_{12}$–$C_{15}$ alkyl ethoxysulfate salts with an average of from one to five ethoxy groups per mole, and most preferably with an average of from one to three ethoxy groups per mole.

The $C_{11}$–$C_{18}$ alcohol itself can be obtained from natural or synthetic sources. Thus, $C_{11-C18}$ alcohols, derived from natural fats, or Ziegler olefin build-up, or OXO synthesis can form suitable sources for the alkyl group. Examples of synthetically derived materials include Dobanol 25 (RTM) sold by Shell Chemicals (UK) Ltd which is a blend of $C_{12}$–$C_{15}$ alcohols, Ethyl 24 sold by the Ethyl Corporation, a blend of $C_{13}$–$C_{15}$ alcohols in the ratio 67% $C_{13}$, 33% $C_{15}$ sold under the trade name Lutensol by BASF GmbH and Synperonic (RTM) by ICI Ltd., and Lial 125 sold by Liquichimica Italiana. Examples of naturally occurring materials from which the alcohols can be derived are coconut oil and palm kernel oil and the corresponding fatty acids. The level of $C_{11}$–$C_{18}$ alkyl ethoxysulfate is preferably from 0.5% to 10% more preferably from 0.5% to 5% and most preferably from 1% to 3% by weight of the composition.

Other anionic surfactants suitable for the purposes of the invention are the alkali metal sarcosinates of formula

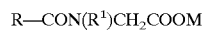

$$R\text{—}CON(R^1)CH_2COOM$$

wherein R is a $C_5$–$C_{17}$ linear or branched alkyl or alkenyl group, $R^1$ is a $C_1$–$C_4$ alkyl group and M is an alkali metal ion. Preferred examples are the lauroyl, Cocoyl $C_{12}$–$C_{14}$), myristyl and oleyl methyl sarcosinates in the form of their sodium salts.

One class of nonionic surfactants useful in the present invention comprises condensates of ethylene oxide with a hydrophobic moiety, providing surfactants having an average hydrophilic-lipophilic balance (HLB) in the range from 8 to 17, preferably from 9.5 to 13.5, more preferably from 10 to 12.5. The hydrophobic (lipophilic) moiety may be aliphatic or aromatic in nature and the length of the polyoxyethylene group which is condensed with any particular hydrophobic group can be readily adjusted to yield a water-soluble compound having the desired degree of balance between hydrophilic and hydrophobic elements.

Especially preferred nonionic surfactants of this type are the $C_9$–$C_{15}$ primary alcohol ethoxylates containing an average of from 3–8 moles of ethylene oxide per mole of alcohol, particularly the $C_{14}$–$C_{15}$ primary alcohols containing an average of from 6–8 moles of ethylene oxide per mole of alcohol and the $C_{12}$–$C_{15}$ primary alcohols containing an average of from 3–5 moles of ethylene oxide per mole of alcohol.

Another class of nonionic surfactants comprises alkyl polyglucoside compounds of general formula

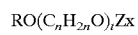

$$RO(C_nH_{2n}O)_tZx$$

wherein Z is a moiety derived from glucose; R is a saturated hydrophobic alkyl group that contains from 6 to 18 carbon atoms; t is from 0 to 10 and n is 2 or 3; x is from 1.1 to 4, the compounds including less than 10% unreacted fatty alcohol and less than 50% short chain alkyl polyglucosides.

Compounds of this type and their use in detergent compositions are disclosed in EP-B 0070074, 0070077, 0075996 and 0094118.

Another preferred nonionic surfactant is a polyhydroxy fatty acid amide surfactant compound having the structural formula:

wherein: $R^1$ is H, $C_1$–$C_4$ hydrocarbyl, 2-hydroxy ethyl, 2-hydroxy propyl, or a mixture thereof, preferably $C_1$–$C_4$ alkyl, more preferably $C_1$ or $C_2$ alkyl, most preferably $C_1$ alkyl (i.e., methyl); and $R^2$ is a $C_5$–$C_{31}$ hydrocarbyl, preferably straight chain $C_7$–$C_{19}$ alkyl or alkenyl, more preferably straight chain $C_9$–$C_{17}$ alkyl or alkenyl, most preferably straight chain $C_{11}$–$C_{17}$ alkyl or alkenyl, or mixture thereof: and Z is a polyhydroxyhydrocarbyl having a linear hydrocarbyl chain with at least 3 hydroxyls directly connected to the chain, or an alkoxlylated derivative (preferably ethoxylated or propoxylated) thereof. Z preferably will be derived from a reducing sugar in a reductive amination reaction; more preferably Z is a glycityl. Suitable reducing sugars include glucose, fructose, maltose, lactose, galactose, mannose, and xylose. As raw materials, high dextrose corn syrup, high fructose corn syrup, and high maltose corn syrup can be utilized as well as the individual sugars listed above. These corn syrups may yield a mix of sugar components for Z. It should be understood that it is by no means intended to exclude other suitable raw materials. Z preferably will be selected from the group consisting of —$CH_2$—$(CHOH)_n$—$CH_2OH$, —$CH(CH_2OH)$—$(CHOH)_{n-1}$—$CH_2OH$, —$CH_2$—$(CHOH)_2(CHOR')(CHOH)$—$CH_2OH$, where n is an integer from 3 to 5, inclusive, and R' is H or a cyclic or aliphatic monosaccharide, and alkoxylated derivatives thereof. Most preferred are glycityls wherein n is 4, particularly —$CH_2$—$(CHOH)_4$—$CH_2OH$.

In Formula (I), $R^1$ can be, for example, N-methyl, N-ethyl, N-propyl, N-isopropyl, N-butyl, N-2-hydroxy ethyl, or N-2-hydroxy propyl.

$R^2$—CO—N< can be, for example, cocamide, stearamide, oleamide, lauramide, myristamide, capricamide, palmitamide, tallowamide, etc.

Z can be 1-deoxyglucityl, 2-deoxyfructityl, 1-deoxymaltityl, 1-deoxylactityl, 1-deoxygalactityl, 1-deoxymannityl, 1-deoxymalto-triotityl, etc. Preferred compound are N-methyl N-1deoxyglucityl $C_{14}$–$C_{18}$ fatty acid amides.

A further class of surfactants are the semi-polar surfactants such as amine oxides. Suitable amine oxides are selected from mono $C_6C_{20}$, preferably $C_{10}$–$C_{14}$ N-alkyl or alkenyl amine oxides and propylene-1,3-diamine dioxides wherein the remaining N positions are substituted by methyl, hydroxyethyl or hydroxpropyl groups.

Cationic surfactants can also be used in the detergent compositions herein and suitable quaternary ammonium surfactants are selected from mono $C_8$–$C_{16}$, preferably $C_{10}C_{14}$ N-alkyl or alkenyl ammonium surfactants wherein remaining N positions are substituted by methyl, hydroxyethyl or hydroxypropyl groups.

Laundry detergent compositions incorporating the bleaching compositions of the invention comprise from 3% to 35% of surfactant but more usually comprise from 5% to 25%, more preferably from 10% to 25% surfactant by weight of the compositions.

Machine dishwashing detergent compositions incorporating the bleaching compositions of the invention comprise from 0% to 10% by weight, preferably from 0.5% to 10% by weight, most preferably from 1% to 5% of surfactant by weight of the compositions. The surfactants may be selected from anionic, cationic, nonionic, amphotonic or zwitterionic surfactants. Most preferably the surfactants are low-foaming. A typical listing of surfactants for inclusion in automatic dishwashing detergent compositions is given in EP-A-0414 549. Most preferred are low-foaming nonionic surfactants, especially the water soluble ethoxylated $C_6$–$C_{16}$ fatty alcohols and $C_6$–$C_{16}$ mixed ethoxylated/propoxylated fatty alcohols and mixtures thereof. Preferably, the ethoxylated fatty alcohols are the $C_{10}$–$C_{16}$ ethoxylated fatty alcohols with a degree of ethoxylation of from 5 to 50, most preferably these are the $C_{12}$–$C_{16}$ ethoxylated fatty alcohols with a degree of ethoxylation from 8 to 40. Preferably the mixed ethoxylated/propoxylated fatty alcohols have an alkyl chain length of from 10 to 16 carbon atoms, a degree of ethoxylation of from 3 to 30 and a degree of propoxylation of from 1 to 10.

Combinations of surfactant types are preferred, more especially anionic-nonionic and also anionic-nonionic-cationic blends. Particularly preferred combinations are described in GB-A-2040987 and EP-A-0087914. Although the surfactants can be incorporated into the compositions as mixtures, it is preferable to control the point of addition of each surfactant in order to optimise the physical characteristics of the composition and avoid processing problems.

Preferred modes and orders of surfactant addition are described hereinafter.

Another highly preferred component of the detergent compositions of the invention is a detergent builder system comprising one or more other non-phosphate detergent builders. These can include, but are not restricted to, crystalline layered sodium silicates, carbonates borates, alkali metal aluminosilicates, monomeric polycarboxylates, homo or copolymeric polycarboxylic acids or their salts in which the polycarboxylic acid comprises at least two carboxylic radicals separated from each other by not more than two carbon atoms, carbonates, silicates and mixtures of any of the foregoing.

Preferred non-phosphate builder salts are the crystalline layered sodium silicates of the general formula

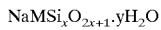

wherein M is sodium or hydrogen, x is a number from 1.9 to 4 and y is a number from 0 to 20. Crystalline layered sodium silicates of this type are disclosed in EP-A-0164514 and methods for their preparation are disclosed in DE-A-3417649 and DE-A-3742043. For the purposes of the present invention, x in the general formula above has a value of 2, 3 or 4 and is preferably 2. More preferably M is sodium and y is 0 and preferred examples of this formula comprise the α-, β-, γ- and δ-forms of $Na_2Si_2O_5$. These materials are available from Hoechst AG FRG as respectively NaSKS-5, NaSKS-7, NaSKS-11 and NaSKS-6. The most preferred material is δ-$Na_2Si_2O_5$, NaSKS-6.

These materials are processed into free flowing solids with a particle size of from 150 to 1000 micrometers and a bulk density of at least 800 g/liter preferably approximately 900 g/liter. However, as made, the crystals are fragile and break down easily into particles of size less than 100 micrometers.

The laundry detergent compositions incorporating the bleaching compositions of the present invention preferably comprise crystalline layered sodium silicate at a level of from 1% to 80% by weight of the composition, more preferably from 5% to 40% and most preferably from 5% to 20% by weight.

The crystalline layered sodium silicate material is preferably present as a particulate in intimate admixture with a solid, water-soluble ionisable material. The solid, water-soluble ionisable material is selected from organic acids, organic and inorganic acid salts and mixtures thereof. The primary requirement is that the material should contain at least one functional acidic group of which the pKa should be less than 9, providing a capability for at least partial neutralisation of the hydroxyl ions released by the crystalline layered silicate. Surprisingly, it has been found for the purposes of the present invention, that the ionisable material need not have a pH <7 in solution, or be present in an amount capable of providing hydrogen ions in stoichiometric parity with the hydroxyl ions produced by dissolution of the crystalline silicate. In fact neutralisation of the ionisable material during storage of the particulate, whilst causing a loss in fabric damage benefit, does not eliminate it.

The ionisable material should also have a mean particle size not greater than 300 micrometers and preferably not greater than 100 micrometers. This facilitates uniform distribution of the ionisable material and the crystalline silicate and is believed to enhance localised pH reduction when the particulate dissolves in the wash liquor.

Suitable organic acids include ascorbic, citric, glutaric, gluconic, glycolic, malic, maleic, malonic, oxalic, succinic and tartaric acids, 1 hydroxy ethane 1,1-diphosphonic acid (EHDP), amino poly methylene phosphonic acids such as NTMP, EDTMP & DETPMP, and mixtures of any of the foregoing. Suitable acid salts include sodium hydrogen carbonate, sodium hydrogen oxalate, sodium hydrogen sulphate, sodium acid pyrophosphate, sodium acid orthophosphate, sodium hydrogen tartrate or mixtures of any of the foregoing.

The particulate mixture of crystalline layered silicate and solid water soluble ionisable material will have a pH of at least 10 (as measured on a 1% solution in 20° C. distilled water) and more usually will have a pH of at least 11, normally at least 11.5.

The incorporation of other ingredients additional to the crystalline layered silicate and ionisable water soluble compound can be advantageous particularly in the processing of the particulate and also in enhancing the stability of detergent compositions in which the particulates are included. In particular, certain types of agglomerates may require the addition of one or more binder agents in order to assist in binding the silicate and ionisable water soluble material so as to produce particulates with acceptable physical characteristics. The binder agents may be present at a level of from 0% to 20% by weight of the composition. Preferably, the binder agents will be in intimate admixture with the silicate and ionisable water soluble material. Preferred binder agents have a melting point between 30° C.–70° C. The binder agents are preferably present in amounts from 1–10% by weight of the composition and most preferably from 2–5% by weight of the composition.

Preferred binder agents include the $C_{10}$–$C_{20}$ alcohol ethoxylates containing from 5–100 moles of ethylene oxide per mole of alcohol and more preferably the $C_{15}$–$C_{20}$ primary alcohol ethoxylates containing from 20–100 moles of ethylene oxide per mole of alcohol.

Other preferred binder agents include certain polymeric materials. Polyvinylpyrrolidones with an average molecular weight of from 12,000 to 700,000 and polyethylene glycols with an average weight of from 600 to 10,000 are examples of such polymeric materials. Copolymers of maleic anhydride with ethylene, methylvinyl ether or methacrylic acid, the maleic anhydride constituting at least 20 mole percent of the polymer are further examples of polymeric materials useful as binder agents. These polymeric materials may be used as such or in combination with solvents such as water, propylene glycol and the above mentioned $C_{10}$–$C_{20}$ alcohol ethoxylates containing from 5–100 moles of ethylene oxide per mole. Further examples of binder agents in accord with the invention include the $C_{10}$–$C_{20}$ mono- and diglycerol ethers and also the $C_{10}$–$C_{20}$ fatty acids. Solutions of certain inorganic salts including sodium silicate are also of use for this purpose.

Cellulose derivatives such as methylcellulose, carboxymethylcellulose and hydroxyethylcellulose, and homo- or co-polymeric polycarboxylic acid or their salts are other examples of binder agents in accord with the invention.

The particulate can also include other components that are conventional in detergent compositions, provided that these are not incompatible per se and do not interfere with the building function of the crystalline layered silicate. Thus the particulate can include up to 50% by weight of the particulate of an anionic, nonionic, ampholytic or zwitterionic surfactant or a mixture of any of these and certain preferred particulate embodiments incorporate surfactants. Examples of such surfactants are described more fully hereinafter. However it is important that any surfactant material that is incorporated into the particulate does not introduce a level of free (unbound) moisture that can even partially dissolve the crystalline layered silicate. For this purpose, the surfactant should be solid and should preferably contain no more than about 5% free (unbound) moisture, preferably no more than 2% free moisture and most preferably less than 1% free moisture.

Other ingredients can also be incorporated in a total amount of up to 50% by weight of the particulate, subject to the same conditions set out above for the inclusion of surfactants. Thus such optional ingredients should preferably be solid at normal (ambient) temperatures, and should contain no more than 5% by weight of free (unbound) moisture, preferably less than 1%.

Non-aqueous liquid components can be incorporated in amounts of up to 20% by weight of the particulate provided that the crystalline layered silicate does not have an appreciable solubility in such components. This also applies to normally solid components applied in a molten form to serve as agglomeration/coating agents for the particulate.

The particulates can take a variety of physical forms such as extrudates, marumes, agglomerates, flakes or compacted granules. A preferred process for preparing compacted granules comprising crystalline layered silicate and a solid, water-soluble ionisable material has been disclosed in the commonly assigned British Application No. 9108639.7 filed on 23 Apr. 1991 (Attorney's Docket No. CM369F).

Whilst a range of aluminosilicate ion exchange materials can be used, preferred sodium aluminosilicate zeolites have the unit cell formula

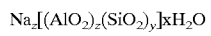

$$Na_z[(AlO_2)_z(SiO_2)_y]xH_2O$$

wherein z and y are at least 6; the molar ratio of z to y is from 1.0 to 0.5 and x is at least 5, preferably from 7.5 to 276, more preferably from 10 to 264. The aluminosilicate materials are in hydrated form and are preferably crystalline, containing from 10% to 28%, more preferably from 18% to 22% water in bound form.

The above aluminosilicate ion exchange materials are further characterised by a particle size diameter of from 0.1 to 10 micrometers, preferably from 0.2 to 4 micrometers. The term "particle size diameter" herein represents the average particle size diameter of a given ion exchange material as determined by conventional analytical techniques such as, for example, microscopic determination utilizing a scanning electron microscope or by means of a laser granulometer. The aluminosilicate ion exchange materials are further characterised by their calcium ion exchange capacity, which is at least 200 mg equivalent of $CaCO_3$ water hardness/g of aluminosilicate, calculated on an anhydrous basis, and which generally is in the range of from 300 mg eq./g to 352 mg eq./g. The aluminosilicate ion exchange materials herein are still further characterised by their calcium ion exchange rate which is at least 130 mg equivalent of $CaCO_3$/liter/minute/(g/liter) [2 grains $Ca^{++}$/gallon/minute/gram/gallon)] of aluminosilicate (anhydrous basis), and which generally lies within the range of from 130 mg equivalent of $CaCO_3$/liter/minute/(gram/liter) [2 grains/gallon/minute/(gram/gallon)] to 390 mg equivalent of $CaCO_3$/liter/minute/(gram/liter) [6 grains/gallon/minute/(gram/gallon)], based on calcium ion hardness.

Optimum aluminosilicates for builder purposes exhibit a calcium ion exchange rate of at least 260 mg equivalent of $CaCO_3$/liter/minute/(gram/liter) [4 grains/gallon/minute/(gram/gallon)].

Aluminosilicate ion exchange materials useful in the practice of this invention are commercially available and can be naturally occurring materials, but are preferably synthetically derived. A method for producing aluminosilicate ion exchange materials is discussed in U.S. Pat. No. 3,985,669. Preferred synthetic crystalline aluminosilicate ion exchange materials useful herein are available under the designations Zeolite A, Zeolite B, Zeolite P, Zeolite X, Zeolite HS, Zeolite MAP, Zeolite Y and mixtures thereof. In an especially preferred embodiment, the crystalline aluminosilicate ion exchange material is Zeolite A and has the formula $$Na_{12}[(AlO_2)_{12}(SiO_2)_{12}] \cdot xH_2O$$

wherein x is from 20 to 30, especially 27. Zeolite X of formula $Na_{86}[(AlO_2)_{86}(SiO_2)_{106}] \cdot 276H_2O$ is also suitable, as well as Zeolite HS of formula $Na_6[(AlO_2)_6(SiO_2)6] \cdot 7.5H_2O$).

Suitable water-soluble monomeric or oligomeric carboxylate builders can be selected from a wide range of compounds but such compounds preferably have a first carboxyl logarithmic acidity/constant ($pK_1$) of less than 9, preferably of between 2 and 8.5, more preferably of between 4 and 7.5.

The logarithmic acidity constant is defined by reference to the equilibrium $$H^+ + A^- \rightleftharpoons HA$$

where A is the fully ionized carboxylate anion of the builder salt.

The equilibrium constant for dilute solutions is therefore given by the expression $$K_1 = \frac{[HA]}{[H^+][A^-]}$$

and $pK_1 = \log_{10} K$.

For the purposes of this specification, acidity constants are defined at 25° C. and at zero ionic strength. Literature values are taken where possible (see Stability Constants of Metal-Ion Complexes, Special Publication No. 25, The Chemical Society, London): where doubt arises they are determined by potentiometric titration using a glass electrode.

The carboxylate or polycarboxylate builder can be momomeric or oligomeric in type although monomeric polycarboxylates are generally preferred for reasons of cost and performance.

Monomeric and oligomeric builders can be selected from acyclic, alicyclic, heterocyclic and aromatic carboxylates having the general formulae

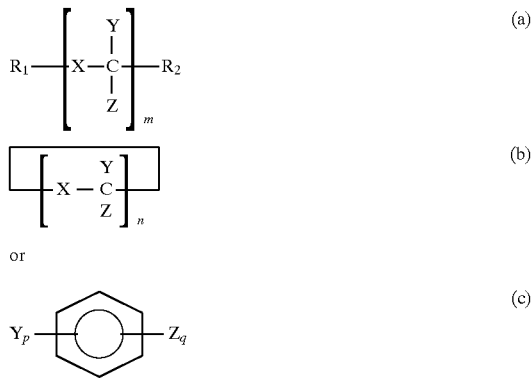

wherein $R_1$ represents H, $C_{1-30}$ alkyl or alkenyl optionally substituted by hydroxy, carboxy, sulfo or phosphono groups or attached to a polyethylenoxy moiety containing up to 20 ethyleneoxy groups; $R_2$ represents H, $C_{1-4}$ alkyl, alkenyl or hydroxy alkyl, or alkaryl, sulfo, or phosphono groups;

X represents a single bond; O; S; SO; $SO_2$; or $NR_1$;

Y represents H; carboxy; hydroxy; carboxymethyloxy; or $C_{1-30}$ alkyl or alkenyl optionally substituted by hydroxy or carboxy groups;

Z represents H; or carboxy;

m is an integer from 1 to 10;

n is an integer from 3 to 6;

p, q are integers from 0 to 6, p+q being from 1 to 6; and wherein, X, Y, and Z each have the same or different representations when repeated in a given molecular formula, and wherein at least one Y or Z in a molecule contain a carboxyl group.

Suitable carboxylates containing one carboxy group include the water soluble salts of lactic acid, glycolic acid and ether derivatives thereof as disclosed in Belgian Patent Nos. 831,368, 821,369 and 821,370. Polycarboxylates containing two carboxy groups include the water-soluble salts of succinic acid, malonic acid, (ethylenedioxy) diacetic acid, maleic acid, diglycolic acid, tartaric acid, tartronic acid and fumaric acid, as well as the ether carboxylates described in German Offenlegenschrift 2,446,686, and 2,446,687 and U.S. Pat. No. 3,935,257 and the sulfinyl carboxylates described in Belgian Patent No. 840,623. Polycarboxylates containing three carboxy groups include, in particular, water-soluble citrates, aconitrates and citraconates as well as succinate derivatives such as the carboxymethyloxysuccinates described in British Patent No. 1,379,241, lactoxysuccinates described in British Patent No. 1,389,732, and aminosuccinates described in Netherlands Application 7205873, and the oxypolycarboxylate materials such as 2-oxa-1,1,3-propane tricarboxylates described in British Patent No. 1,387,447.

Polycarboxylates containing four carboxy groups include oxydisuccinates disclosed in British Patent No. 1,261,829, 1,1,2,2-ethane tetracarboxylates, 1,1,3,3-propane tetracarboxylates and 1,1,2,3-propane tetracarboxylates. Polycarboxylates containing sulfo substituents include the sulfosuccinate derivatives disclosed in British Patent Nos. 1,398,421 and 1,398,422 and in U.S. Pat. No. 3,936,448, and the sulfonated pyrolysed citrates described in British Patent No. 1,439,000.

Alicyclic and heterocyclic polycarboxylates include cyclopentane-cis,cis,cis-tetracarboxylates, cyclopentadienide pentacarboxylates, 2,3,4,5-tetrahydrofuran-cis, cis, cis-tetracarboxylates, 2,5-tetrahydrofuran-cis-dicarboxylates, 2,2,5,5-tetrahydrofuran-tetracarboxylates, 1,2,3,4,5,6-hexane-hexacarboxylates and carboxymethyl derivatives of polyhydric alcohols such as sorbitol, mannitol and xylitol. Aromatic polycarboxylates include mellitic acid, pyromellitic acid and the phthalic acid derivatives disclosed in British Patent No. 1,425,343.

Of the above, the preferred polycarboxylates are hydroxycarboxylates containing up to three carboxy groups per molecule, more particularly citrates.

The parent acids of the monomeric or oligomeric polycarboxylate chelating agents or mixtures thereof with their salts, e.g. citric acid or citrate/citric acid mixtures are also contemplated as components of builder systems of detergent compositions in accordance with the present invention.

Other suitable water soluble organic salts are the homo- or co-polymeric polycarboxylic acids or their salts in which the polycarboxylic acid comprises at least two carboxyl radicals separated from each other by not more than two carbon atoms. Polymers of the latter type are disclosed in GB-A-1,596,756. Examples of such salts are polyacrylates of MWt 2000–5000 and their copolymers with maleic anhydride, such copolymers having a molecular weight of from 20,000 to 70,000, especially about 40,000. These materials are normally used at levels of from 0.5% to 10% by weight more preferably from 0.75% to 8%, most preferably from 1% to 6% by weight of the composition.

The detergent compositions incorporating the bleaching compositions of the present invention will comprise non-phosphate detergent builder compounds at a level of from 1% to 80% by weight of the compositions, more preferably from 10% to 60% by weight and most preferably from 20% to 50% by weight.

Within the preferred laundry detergent compositions, sodium aluminosilicate such as Zeolite A will comprise from 20% to 60% by weight of the total amount of builder, a monomeric or oligomeric carboxylate will comprise from 5% to 30% by weight of the total amount of builder and the crystalline layered silicate will comprise from 10% to 65% by weight of the total amount of builder. In such compositions the builder system preferably also incorporates a combination of auxiliary inorganic and organic builders such as sodium carbonate and maleic anhydride/acrylic acid copolymers in amounts of up to 35% by weight of the total builder.

The detergent compositions may contain optional chelant ingredients. Such optional chelants may include the organic phosphonates, including amino alkylene poly (alkylene phosphonate), alkali metal ethane 1-hydroxy diphosphonates, nitrilo tremethylene phosphonates, ethylene diamine tetra methylene phosphonates and diethylene triamine penta methylene phosphonates. The phosphonate compounds may be present either in their acid form or as a complex of either an alkali or alkaline metal ion, the molar ratio of said metal ion to said phosphonate compound being at least 1:1. Such complexes are described in U.S. Pat. No. 4,259,200. Preferably, the organic phosphonate compounds where present are in the form of their magnesium salt. The level of phosphorus containing chelants in the compositions of the invention is preferably minimised, with their complete exclusion from the compositions being most preferred.

Silicates are useful components of automatic dishwashing detergent compositions incorporating the bleaching compositions of the present invention. Suitable silicates include the water soluble sodium silicates with an $SiO_2:Na_2O$ ratio of from 1.0 to 2.8. The silicates may be in the form of either the anhydrous salt or a hydrated salt. Sodium silicate with an $SiO_2:Na_2O$ ratio of 2.0 is most preferred. Silicates are present in the machine dishwashing detergent compositions at a level of from 5% to 50% by weight of the composition, more preferably from 10% to 40% by weight.

Whilst soluble silicates serve a variety of purposes in conventional laundry detergent formulations, their presence may be unnecessary in detergent compositions incorporating crystalline layered silicate material. However as the crystalline layered silicate, which forms part of the builder system of the detergent composition, must be added as a dry mix ingredient, soluble silicates may still be useful as structurants in the spray dried granules that normally form part of a laundry detergent composition. This is particularly desirable if the spray dried granule does not incorporate an aluminosilicate builder and would otherwise comprise only organic materials. Suitable silicates are those having an $SiO_2:Na_2O$ ratio in the range from 1.6 to 3.4, ratios from 2.0 to 2.8 being preferred.

The detergent compositions incorporating the bleaching compositions of the present invention will generally include an inorganic perhydrate salt, normally in the form of the sodium salt. Suitable inorganic perhydrate salts have been described herein before. The bleaching composition will usually be incorporated to give a perhydrate level of from 3% to 40% by weight, more preferably from 5% to 30% by weight and most preferably from 10% to 25% by weight of the detergent composition.

The detergent compositions incorporating the bleaching compositions of the present invention will also generally include peroxyacid bleach precursors (bleach activators). Suitable peroxyacid bleach precursors have been described hereinbefore. The peroxyacid bleach precursors are normally incorporated at a level of from 1% to 20%, more preferably from 1% to 15%, most preferably from 3% to 10% by weight of the compositions.

The detergent compositions may also contain organic peroxyacids at a level of from 1% to 15% by weight, more preferably from 1% to 10% by weight of the composition.

Detergent compositions in which solid peroxybleach precursors are protected via an acid coating to minimise fabric colour damage are disclosed in the Applicant's copending British Application No. 9102507.2 filed Feb. 6, 1991.

Anti-redeposition and soil-suspension agents suitable herein include cellulose derivatives such as methylcellulose, carboxymethylcellulose and hydroxyethycellulose, homo-or co-polymeric polycarboxylic acids or their salts and ployamino compounds. Polymers of this type include the polyacrylates and copolymers of maleic anhydride with ethylene, methylvinyl ether or methacrylic acid, the maleic anhydride constituting at least 20 mole percent of the copolymer disclosed in detail in EP-A-137669. Polyamino compounds such as those derived from aspartic acid are disclosed in EP-A-305282, EP-A-305283 and EP-A-351629. These materials are normally used at levels of from 0.5% to 10% by weight, more preferably from 0.75% to 8%, most preferably from 1% to 6% by weight of the composition.

Other useful polymeric materials are the polyethylene glycols, particularly those of molecular weight 1000–10000, more particularly 2000 to 8000 and most preferably about 4000. These are used at levels of from 0.20% to 5% more preferably from 0.25% to 2.5% by weight. These polymers and the previously mentioned homo- or co-polymeric polycarboxylate salts are valuable for improving whiteness maintenance, fabric ash deposition, and cleaning performance on clay, proteinaceous and oxidizable soils in the presence of transition metal impurities.

Preferred optical brighteners are anionic in character, examples of which are disodium 4,4¹-bis-(2-diethanolamino-4-anilino-s-triazin-6-ylamino)stilbene-2:2¹ disulphonate, disodium 4,4¹-bis-(2-morpholino - 4-anilino-2-triazin-6-ylaminostilbene-2:2¹-disulphonate,disodium 4,4¹-bis-(2,4-dianilino-s-triazin-6-ylamino)stilbene-2:2¹-disulphonate, monosodium 4¹,4¹¹-bis-(2,4-dianilino-s-triazin-6-ylamino)stilbene-2-sulphonate, disodium 4,4¹-bis-(2-anilino-4-(N-methyl-N-2-hydroxyethylamino)-2-triazin-6-ylamino)stilbene-2,2¹-disulphonate, disodium 4,4¹-bis-(4-phenyl-2,1,3-triazol-2-yl)stilbene-2,2 disulphonate, disodium 4,4¹bis(2-anilino-4-(1-methyl-2-hydroxyethylamino)-s-triazin-6-ylamino)stilbene-2, 2¹disulphonate and sodium 2 (stilbyl-4¹¹-(naphtho-1¹,2¹:4, 5)-1,2,3-triazole-2¹¹-sulphonate.

Soil-release agents useful in detergent compositions are conventionally copolymers or terpolymers of terephthalic acid with ethylene glycol and/or propylene glycol units in various arrangements. Examples of such polymers are disclosed in the commonly assigned U.S. Pat. Nos. 4,116,885 and 4,711,730 and European Published Patent Application No. 0272033. A particular preferred polymer in accordance with EP-A-0272033 has the formula

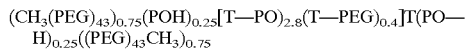

$(CH_3(PEG)_{43})_{0.75}(POH)_{0.25}[T-PO)_{2.8}(T-PEG)_{0.4}]T(PO-H)_{0.25}((PEG)_{43}CH_3)_{0.75}$ where PEG is $-(OC_2H_4)O-$, PO is $(OC_4H_6O)$ and T is (pC OC$_6$H$_4$CO).

Certain polymeric materials such as polyvinyl pyrrolidones, typically of MWt 5000–20000, preferably 10000–15000, also form useful agents in preventing the transfer of labile dyestuffs between fabrics during the washing process.

Another optional detergent composition ingredient is a suds suppressor, exemplified by silicones, and silica-silicone mixtures. Silicones can be generally represented by alkylated polysiloxane materials while silica is normally used in finely divided forms, exemplified by silica aerogels and xerogels and hydrophobic silicas of various types. These materials can be incorporated as particulates in which the suds suppressor is advantageously releasably incorporated in a water-soluble or water-dispersible, substantially non-surface-active detergent-impermeable carrier. Alternatively the suds suppressor can be dissolved or dispersed in a liquid carrier and applied by spraying on to one or more of the other components.

As mentioned above, useful silicone suds controlling agents can comprise a mixture of an alkylated siloxane, of the type referred to hereinbefore, and solid silica. Such mixtures are prepared by affixing the silicone to the surface of the solid silica. A preferred silicone suds controlling agent is represented by a hydrophobic silanated (most preferably trimethyl-silanated) silica having a particle size in the range from 10 nanometers to 20 nanometers and a specific surface area above 50 m²/g, intimately admixed with dimethyl silicone fluid having a molecular weight in the range from about 500 to about 200,000 at a weight ratio of silicone to silanated silica of from about 1:1 to about 1:2.

A preferred silicone suds controlling agent is disclosed in Bartollota et al. U.S. Pat. No. 3,933,672. Other particularly useful suds suppressors are the self-emulsifying silicone suds suppressors, described in German Patent Application DTOS 2,646,126 published Apr. 28, 1977. An example of such a compound is DC0544, commercially available from Dow Corning, which is a siloxane/glycol copolymer.

The suds suppressors described above are normally employed at levels of from 0.001% to 5% by weight of the composition, preferably from 0.1% to 3% by weight.

The preferred methods of incorporation comprise either application of the suds suppressors in liquid form by spray-on to one or more of the major components of the composition or alternatively the formation of the suds suppressors into separate particulates that can then be mixed with the other solid components of the composition. The incorporation of the suds modifiers as separate particulates also permits the inclusion therein of other suds controlling materials such as $C_{20}$–$C_{24}$ fatty acids, microcrystalline waxes and high MWt copolymers of ethylene oxide and propylene oxide which would otherwise adversely affect the dispersibility of the matrix. Techniques for forming such suds modifying particulates are disclosed in the previously mentioned Bartolotta et al U.S. Pat. No. 3,933,672.

Another optional ingredient useful in detergent compositions is one or more enzymes. These may be incorporated at a level of from 0.1% to 10%, more preferably 0.5% to 5% by weight of the detergent composition.

Preferred enzymatic materials include the commercially available amylases, neutral and alkaline proteases, lipases, esterases and cellulases conventionally incorporated into detergent compositions. Suitable enzymes are discussed in U.S. Pat. Nos. 3,519,570 and 3,533,139.

Preferred commercially available protease enzymes include those sold under the tradenames Alcalase and Savinase by Novo Industries A/S (Denmark) and Maxatase by International Bio-Synthetics, Inc. (The Netherlands).

Preferred amylases include, for example, -amylases obtained from a special strain of B licheniforms, described in more detail in GB-1,269,839 (Novo). Preferred commercially available amylases include for example, Rapidase, sold by International Bio-Synthetics Inc, and Termamyl, sold by Novo Industries A/S.

An especially preferred lipase enzyme is manufactured and sold by Novo Industries A/S (Denmark) under the trade name Lipolase (Biotechnology Newswatch, 7 Mar. 1988, page 6) and mentioned along with other suitable lipases in EP-A-0258068 (Novo).

A further optional ingredient useful in detergent compositions is a corrosion inhibitor $C_{14}$–$C_{20}$ fatty acids are preferred examples of such corrosion inhibitors.

Fabric softening agents can also be incorporated into laundry detergent compositions. These agents may be inorganic or organic in type. Inorganic softening agents are exemplified by the smectite clays disclosed in GB-A-1,400, 898. Other suitable inorganic softening systems comprising smectite clays, including hectorite and montmorillonite, are also disclosed in EP-A-0522206. Organic fabric softening agents include the water insoluble tertiary amines as disclosed in GB-A-1514276 and EP-B-0011340.

Their combination with mono $C_{12}$–$C_{14}$ quaternary ammonium salts is disclosed in EP-B-0026527 & 528. Other useful organic fabric softening agents are the dilong chain amides as disclosed in EP-B-0242919. Additional organic ingredients of fabric softening systems include high molecular weight polyethylene oxide materials as disclosed in EP-A-0299575 and 0313146.

Levels of smectite clay are normally in the range from 5% to 15%, more preferably from 8% to 12% by weight, with the material being added as a dry mixed component to the remainder of the formulation. Organic fabric softening agents such as the water-insoluble tertiary amines or dilong chain amide materials are incorporated at levels of from 0.5% to 5% by weight, normally from 1% to 3% by weight, whilst the high molecular weight polyethylene oxide materials and the water soluble cationic materials are added at levels of from 0.1% to 2%, normally from 0.15% to 1.5% by weight. Where a portion of the composition is spray dried, these materials can be added to the aqueous slurry fed to the spray drying tower, although in some instances it may be more convenient to add them as a dry mixed particulate, or spray them as a molten liquid on to other solid components of the composition.

In general detergent compositions can be made via a variety of methods including dry mixing, spray drying, agglomeration and granulation and preferred methods involve combinations of these techniques. A preferred method of making the granular laundry detergent compositions involves a combination of spray drying, agglomeration in a high speed mixer and dry mixing.

The bulk density of the granular detergent compositions incorporating the bleaching compositons of the present invention may be in the range of about 450 to 600 g/liter as is typical for conventional laundry detergent compositions. Alternatively, the granular detergent compositions may be concentrated granular detergent compositions that are characterised by a relatively high density in comparison with conventional detergent compositions. Such high density compositions have a bulk density of at least 650 g/liter, more usually at least 700 g/liter and more preferably from 800 g/liter to 1100 g/liter.

Bulk density is measured by means of a simple funnel and cup device consisting of a conical funnel moulded rigidly on a base and provided with a flap valve at its lower extremity to allow the contents of the funnel to be emptied into an axially aligned cylindricl cup disposed below the funnel. The funnel is 130 mm and 40 mm at its respective upper and lower extremities. It is mounted so that the lower extremity is 140 mm above the upper surface of the base. The cup has an overall height of 90 mm, an internal height of 87 mm and an internal diameter of 84 mm. Its nominal volume is 500 ml.

To carry out a measurement, the funnel is filled with powder by hand pouring, the flap valve is opened and powder allowed to overfill the cup. The filled cup is removed from the frame and excess powder removed from the cup by passing a straight edged implement e.g. a knife, across its upper edge. The filled cup is then weighed and the value obtained for the weight of powder doubled to provide the bulk density in g/liter. Replicate measurements are made as required.

Concentrated laundry detergent compositions also normally incorporate at least one multi-ingredient component i.e. they do not comprise compositions formed merely by dry-mixing individual ingredients. Compositions in which each individual ingredient is dry-mixed are generally dusty, slow to dissolve and also tend to cake and develop poor particle flow characteristics in storage. Preferably the carbonate and percarbonate are dry mixed with the other ingredients, some or all of which may be spray dried or agglomerated in a multi-component mix.

Preferred laundry detergent compositions comprise at least two particulate multi-ingredient components. The first component comprises at least 15%, conventionally from 25% to 50%, but more preferably no more than 35% by weight of the composition and the second component from 1% to 50%, more preferably 10% to 40% by weight of the composition.

The first component comprises a particulate incorporating an anionic surfactant in an amount of from 0.75% to 40% by weight of the powder and one or more inorganic and/or organic salts in an amount of from 99.25% to 60% by weight of the powder. The particulate can have any suitable form such as granules, flakes, prills, marumes or noodles but is preferably granular. The granules themselves may be agglomerates formed by pan or drum agglomeration or by in-line mixers but are customarily spray dried particles produced by atomising an aqueous slurry of the ingredients in a hot air stream which removes most of the water. The spray dried granules are then subjected to densification steps, e.g. by high speed cutter mixers and/or compacting mills, to increase density before being reagglomerated. For illustrative purposes, the first component is described hereinafter as a spray dried powder.

Suitable anionic surfactants for the purposes of the first component have been found to be slowly dissolving linear alkyl sulfate salts in which the alkyl group has an average of from 16 to 22 carbon atoms, and linear alkyl carboxylate salts in which the alkyl group has an average of from 16 to 24 carbon atoms. The alkyl groups for both types of surfactant are preferably derived from natural sources such as tallow fat and marine oils.

The level of anionic surfactant in the spray dried powder forming the first component is from 0.75% to 40% by weight, more usually 2.5% to 25% preferably from 3% to 20% and most preferably from 5% to 15% by weight. Water-soluble surfactants such as linear alkyl benzene sulphonates or $C_{14}$–$C_{15}$ alkyl sulphates can be included or alternatively may be applied subsequently to the spray dried powder by spray on.

The other major ingredient of the spray dried powder is one or more inorganic or organic salts that provide the crystalline structure for the granules. The inorganic and/or organic salts may be water-soluble or water-insoluble, the latter type being comprised by the, or the major part of the, water-insoluble builders where these form part of the builder ingredient. Suitable water soluble inorganic salts include the alkali metal carbonates and bicarbonates. Amorphous alkali metal silicates may also be used to provide structure to the spray dried granule provided that aluminosilicate does not form part of the spray dried component.

However, in concentrated detergent compositions it is preferred that no sodium sulphate is added as a separate ingredient and its incorporation as a by-product e.g. with sulph(on)ated surfactants, should be minimised.

Where an aluminosilicate zeolite forms the, or part of, the builder ingredient, it is preferred that it is not added directly by dry-mixing to the other components, but is incorporated into the multi-ingredient component(s).

The first component can also include up to 15% by weight of miscellaneous ingredients such as brighteners, antiredeposition agents, photoactivated bleaches (such as tetrasulfonated zinc phthalocyanine) and chelants. Where the first component is a spray dried powder it will normally be dried to a moisture content of from 7% to 11% by weight, more preferably from 8% to 10% by weight of the spray dried powder. Moisture contents of powders produced by other processes such as agglomeration may be lower and can be in the range 1–10% by weight.

The particle size of the first component is conventional and preferably not more than 5% by weight should be above 1.4 mm, while not more than 10% by weight should be less than 0.15 mm in maximum dimension. Preferably at least 60%, and most preferably at least 80%, by weight of the powder lies between 0.7 mm and 0.25 mm in size. For spray dried powders, the bulk density of the particles from the spray drying tower is conventionally in the range from 540 to 600 g/liter and this is then enhanced by further processing steps such as size reduction in a high speed cutter/mixer followed by compaction. Alternatively, processes other than spray drying may be used to form a high density particulate directly.

A second component of a preferred detergent composition is another multi-ingredient particulate containing a water soluble surfactant.

This may be anionic, nonionic, cationic or semipolar in type or a mixture of any of these. Suitable surfactants are listed hereinbefore but preferred surfactants are $C_{14}$–$C_{15}$ alkyl sulphates, linear $C_{11}$–$C_{15}$ alkyl benzene sulphonates and fatty $C_{14}$–$C_{18}$ methyl ester sulphonates.

The second component may have any suitable physical form, i.e. it may take the form of flakes, prills, marumes, noodles, ribbons, or granules which may be spray-dried or non spray-dried agglomerates. Although the second component could in theory comprise the water soluble surfactant on its own, in practice at least one organic or inorganic salt is included to facilitate processing. This provides a degree of crystallinity, and hence acceptable flow characteristics, to the particulate and may be any one or more of the organic or inorganic salts present in the first component.

The particle size range of the second component should be such as to obviate segregation from the particles of the first component when blended therewith. Thus not more than 5% by weight should be above 1.4 mm while not more than 10% should be less than 0.15 mm in maximum dimension.

The bulk density of the second component will be a function of its mode of preparation. However, the preferred form of the second component is a mechanically mixed agglomerate which may be made by adding the ingredients dry or with an agglomerating agent to a pan agglomerator, Z blade mixer or more preferably an in-line mixer such as those manufactured by Schugi (Holland) BV, 29 Chroomstraat 8211 AS, Lelystad, Netherlands and Gebruder Lodige MaschinenbanGmbH, D-4790 Paderborn 1, Elsenerstrasse 7-9, Postfach 2050 F.R.G. By this means the second component can be given a bulk density in the range from 650 g/liter to 1190 g/liter more preferably from 750 g/liter to 850 g/liter.

Preferred laundry detergent compositions include a level of alkali metal carbonate in the second component corresponding to an amount of from 3% to 15% by weight of the composition, more preferably from 5% to 12% by weight. This will provide a level of carbonate in the second component of from 20% to 40% by weight.

A highly preferred ingredient of the second component is also a hydrated water insoluble aluminosilicate ion exchange material of the synthetic zeolite type, described hereinbefore, present at from 10% to 35% by weight of the second component. The amount of water insoluble aluminosilicate material incorporated in this way is from 1% to 10% by weight of the composition, more preferably from 2% to 8% by weight.

In one process for preparing the second component, the surfactant salt is formed in situ in an inline mixer. The liquid acid form of the surfactant is added to a mixture of particulate anhydrous sodium carbonate and hydrated sodium aluminosilicate in a continuous high speed blender, such as a Lodige C6 mixer, and neutralised to form the surfactant salt whilst maintaining the particulate nature of the mixture. The resultant agglomerated mixture forms the second component which is then added to other components of the product. In a variant of this process, the surfactant salt is pre-neutralised and added as a viscous paste to the mixture of the other ingredients. In the variant, the mixer serves merely to agglomerate the ingredients to form the second component.

In a particularly preferred process for making the granular laundry detergent compositions, part of the spray dried product comprising the first granular component is diverted and subjected to a low level of nonionic surfactant spray on before being reblended with the remainder. The second granular component is made using the preferred process described above. The first and second components together with a crystalline layered silicate particulate composition, the perhydrate bleach and any peroxy acid bleach precursor particles, other dry mix ingredients such as any carboxylate chelating agent, soil-release polymer and enzyme are then fed to a conveyor belt, from which they are transferred to a horizontally rotating drum in which perfume and silicone suds suppressor are sprayed on to the product. In highly preferred compositions, a further drum mixing step is employed in which a low (approx. 2% by weight) level of finely divided crystalline material is introduced to increase density and improve granular flow characteristics.

In preferred concentrated detergent products incorporating an alkali metal percarbonate as the perhydrate salt it has been found necessary to control several aspects of the product such as its heavy metal ion content and its equilibrium relative humidity.

Laundry detergent compositions in accordance with the invention can also benefit from delivery systems that provide transient localised high concentrations of product in the drum of an automatic washing machine at the start of the wash cycle, thereby also avoiding problems associated with loss of product in the pipework or sump of the machine.

Delivery to the drum can most easily be achieved by incorporation of the composition in a bag or container from which it is rapidly releasable at the start of the wash cycle in response to agitation, a rise in temperature or immersion in the wash water in the drum. Alternatively the washing machine itself may be adapted to permit direct addition of the composition to the drum e.g. by a dispensing arrangement in the access door.

Products comprising a laundry detergent composition enclosed in a bag or container are usually designed in such a way that container integrity is maintained in the dry state to prevent egress of the contents when dry, but are adapted for release of the container contents on exposure to a washing environment, normally on immersion in an aqueous solution.

Usually the container will be flexible, such as a bag or pouch. The bag may be of fibrous construction coated with a water impermeable protective material so as to retain the contents, such as is disclosed in European published Patent Application No. 0018678. Alternatively it may be formed of a water-insoluble synthetic polymeric material provided with an edge seal or closure designed to rupture in aqueous media as disclosed in European published Patent Application Nos. 0011500, 0011501, 0011502, and 0011968. A convenient form of water frangible closure comprises a water soluble adhesive disposed along and sealing one edge of a pouch formed of a water impermeable polymeric film such as polyethylene or polypropylene. In a variant of the bag or container form, laminated sheet products can be employed in which a central flexible layer is impregnated and/or coated with a composition and then one or more outer layers are applied to produce a fabric-like aesthetic effect. The layers may be sealed together so as to remain attached during use, or may separate on contact with water to facilitate the release of the coated or impregnated material.

An alternative laminate form comprises one layer embossed or deformed to provide a series of pouch-like containers into each of which the detergent components are deposited in measured amounts, with a second layer overlying the first layer and sealed thereto in those areas between the pouch-like containers where the two layers are in contact. The components may be deposited in particulate, paste or molten form and the laminate layers should prevent egress of the contents of the pouch-like containers prior to their addition to water. The layers may separate or may remain attached together on contact with water, the only requirement being that the structure should permit rapid release of the contents of the pouch-like containers into solution. The number of pouch-like containers per unit area of substrate is a matter of choice but will normally vary between 500 and 25,000 per square meter.

Suitable materials which can be used for the flexible laminate layers in this aspect of the invention include, among others, sponges, paper and woven and non-woven fabrics.

However the preferred means of carrying a laundry process is to introduce the composition into the liquid surrounding the fabrics that are in the drum via a reusable dispensing device having walls that are permeable to liquid but impermeable to the solid composition.

Devices of this kind are disclosed in European Patent Application Publication Nos. 0343069 & 0343070. The latter Application discloses a device comprising a flexible sheath in the form of a bag extending from a support ring defining an orifice, the orifice being adapted to admit to the bag sufficent product for one washing cycle. A portion of the washing medium flows through the orifice into the bag, dissolves the product, and the solution then passes outwardly through the orifice into the washing medium. The support ring is provided with a masking arrangement to prevent egress of wetted, undissolved, product, this arrangement typically comprising radially extending walls extending from a central boss in a spoked wheel configuration, or a similar structure in which the walls have a helical form.

An article by J. Bland published in Manufacturing Chemist, November 1989, pages 41–46 also describes especially preferred dispensing devices for use with granular laundry detergent products which are of a type commonly known as the "granulette".

A laundry detergent composition according to the invention is illustrated in the following non limiting example in which all percentages are on a weight basis unless otherwise stated.

In the detergent compositions, the abbreviated component identifications have the following meanings:

LAS: Sodium linear $C_{12}$ alkyl benzene sulphonate $C_{16-18}$ AS: Sodium $C_{16}$–$C_{18}$ alkyl sulphate.

$C_{14-15}$ AE7: A $C_{14}$–$C_{15}$ primary alcohol condensed with an average of 7 moles of ethylene oxide per mole.

TAED: Tetraacetyl ethylene diamine

Silicate: Amorphous Sodium Silicate ($SiO_2$:$Na_2O$ ratio normally follows)

CMC: Sodium carboxymethyl cellulose

Zeolite 4A: Hydrated Sodium Aluminosilicate of formula $Na_{12}(AlO_2SiO_2)12 \cdot 27H_2O$ having a primary particle size in the range from 1 to 10 micrometers Citrate: Tri-sodium citrate dihydrate MA/AA: Copolymer of 1:4 maleic/acrylic acid, average molecular weight about 70,000, available from BASF under the trade name Sokalan CP5

DTPMP: Diethylene triamine penta (Methylene phosphonic acid), marketed by Monsanto under the Trade name Dequest 2060

Suds: A mixture of hydrophobic silica and silicone oil

Percarbonate: Anhydrous sodium percarbonate bleach of empirical formula $2Na_2CO_3 \cdot 3H_2O_2$ Savinase: Proteolyic enzyme sold by Novo Industries A/S.

Lipase: Lipolytic enzyme sold by Novo Industries A/S.

| | |
|---|---|
| LAS | 7% |
| C16–18 AS | 2% |
| C14–15 AE7 | 4% |
| Silicate 2.0r | 4% |
| Copolymer AA/MA | 4% |
| Zeolite 4A | 20% |
| Citrate | 5% |
| Phosphonate - DTPMP | 0.4% |
| TAED | 5% |
| CMC | 0.5% |
| Suds Suppressor | 1% |
| Savinase (4.0 KNPU/g) | 1.5% |
| Lipolase (100,000 LU/g | 0.4% |
| Sodium Carbonate (anhydrous) | 15% |
| Percarbonate | 20% |
| Balance Moisture/Miscellaneous | 100% |
| Sodium Carbonate Particle Size | >2360 µm 0% |
| | >850 µm 18.5% |
| | >425 µm 60% |
| | >250 µm 91% |
| | <150 µm 2.5% |

What is claimed is:

1. A particulate composition comprising:

(a) an alkali metal percarbonate salt; and (b) particles of alkali metal bicarbonate, said particles having a mean particle size of 300 µm or greater, wherein fewer than 10% of the bicarbonate particles have a particle size of below 250 µm and where the percarbonate and bicarbonate have been introduced into the composition by dry mixing; and wherein said particulate composition comprises discrete particles of said alkali metal bicarbonate and said metal percarbonate salt.

2. A composition according to claim 1 which is a laundry detergent composition which also comprises surfactant in an amount from 3 to 35% by weight of total composition, said surfactant being selected from the group consisting of anionic, cationic, non-anionic amphoteric, zwitterionic surfactants and mixtures thereof.

3. A composition according to claim 1 which is a machine dishwashing composition which also comprises alkaline material selected from the group consisting of sodium silicate and sodium hydroxide.

4. A composition according to claim 1 which is a bleach booster composition suitable for addition to a laundry wash.

5. A composition according to claim 1 wherein the bicarbonate particles have a mean particle size of between 400 µm and 800 µm.

6. A composition according to claim 1 additionally comprising additional bleach adjuvents selected from the group consisting of peroxyacid bleach precursors, organic peroxyacids and mixtures thereof.

7. A composition according to claim 6, wherein the additional bleaching adjuvent is TAED.

8. A laundry detergent composition claim 1, which is phosphate-free, comprises from 1 to 80% by weight of total composition of non-phosphate detergent builder compounds.

9. A Laundry detergent composition according to claim 8, wherein the non-phosphate detergent builder compounds are selected from the group consisting of crystalline layered sodium silicates, sodium aluminosilicate zeolites and mixtures thereof.

10. A particulate composition comprising:
(a) an alkali metal percarbonate salt and
(b) particles of alkali metal bicarbonate, said particles having a mean particle size of between 400 μm and 800 μm and wherein fewer than 10% of said particles have a particle size of below 250 μm and wherein the percarbonate and bicarbonate have been introduced into the composition by dry mixing.

11. A composition according to claim 10, which is a bleach booster composition suitable for addition to a laundry wash.

12. A composition according to claim 13 which is a machine dishwashing composition which also comprises alkaline material selected from the group consisting of sodium silicate and sodium hydroxide.

13. A composition according to claim 10 which is a laundry detergent composition which also comprises surfactant in an amount from 3 to 35% by weight of total composition, said surfactant being selected from the group consisting of anionic, cationic, non-anionic amphoteric, zwitterionic surfactants and mixtures thereof.

14. A laundry detergent composition according to claim 13, which is phosphate-free and comprises from 1 to 80% by weight of total composition of non-phosphate detergent builder compounds.

15. A laundry detergent composition according to claim 14, wherein the non-phosphate detergent builder compounds are selected from the group consisting of crystalline layered sodium silicates, sodium aluminosilicate zeolites and mixtures thereof.

16. A particulate laundry detergent composition, comprising:
(a) an alkali metal percarbonate salt; and
(b) particles of alkali metal carbonate, said particles having a mean particle size of between 400 μm and 800 μm and with fewer than 10% of said particles have a particle size of below 250 μm and where the percarbonate and bicarbonate have been introduced into the composition by dry mixing;
(c) a surfactant in an amount of form about 3% to about 35% by weight of total composition, said surfactant being selected from the group consisting of anionic, cationic, non-anionic, ampholytic, zwitterionic surfactants and mixtures thereof; and wherein said particulate laundry detergent composition comprises discrete particles of said alkali metal carbonate and said metal percarbonate salt.

17. A particulate laundry composition according to claim 16, which is phosphate free and comprises from about 1 to about 80% by weight of total composition of non-phosphate detergent builder compounds.

18. A particulate laundry composition according to claim 17, wherein the non-phosphate detergent builder compounds are selected from the group consisting of crystalline layered sodium silicates, sodium aluminosilicates and mixtures thereof.

19. A particulate machine dishwashing composition, comprising:
(a) an alkali metal percarbonate salt;
(b) particles of alkali metal carbonate, said particles having a mean particle size of between 4000 μm and 800 μm and with fewer than 10% of said particles have a particle size of below 250 μm and where the percarbonate and bicarbonate have been introduced into the composition by dry mixing;
(c) alkaline material selected from the group consisting of sodium silicate and sodium hydroxide; and wherein said particulate composition comprises discrete particles of said alkali metal carbonate and said metal percarbonate salt.

* * * * *